(12) United States Patent
Brill

(10) Patent No.: US 6,845,101 B1
(45) Date of Patent: Jan. 18, 2005

(54) METHOD AND A NETWORK FOR ATM SWITCHING

(75) Inventor: Arno Brill, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/623,638

(22) PCT Filed: Mar. 11, 1999

(86) PCT No.: PCT/DE99/00673

§ 371 (c)(1),
(2), (4) Date: Sep. 6, 2000

(87) PCT Pub. No.: WO99/46953

PCT Pub. Date: Sep. 16, 1999

(30) Foreign Application Priority Data

Mar. 11, 1998 (DE) .......................... 198 10 559

(51) Int. Cl.[7] .............................................. H04Q 11/04
(52) U.S. Cl. ..................................... 370/397; 370/468
(58) Field of Search ................................ 370/468, 397, 370/395.3, 396, 395.1, 389, 400, 351, 237, 230

(56) References Cited

U.S. PATENT DOCUMENTS

| | | | |
|---|---|---|---|
| 3,536,842 A | | 10/1970 | Ewin et al. |
| 4,669,113 A | | 5/1987 | Ash et al. |
| 4,862,496 A | | 8/1989 | Kelly et al. |
| 5,491,690 A | * | 2/1996 | Alfonsi et al. ............... 370/404 |
| 5,926,456 A | * | 7/1999 | Takano et al. ............... 370/218 |
| 6,002,688 A | * | 12/1999 | Song ........................ 370/395.3 |
| 6,389,128 B1 | | 5/2002 | Stademann |

FOREIGN PATENT DOCUMENTS

| | | |
|---|---|---|
| DE | 19531609 | 3/1996 |
| EP | 0 538 853 | 4/1993 |
| EP | 0696147 | 8/1994 |
| WO | WO93/08666 | 4/1993 |

OTHER PUBLICATIONS

ITU–T Recommendation Q.2764, Broadband Integrated Services Digital Network (B–ISDN) Signalling System No. 7 B–ISDN User Part (B–ISUP)—Basic Call Procedures, Feb. 1995, pp. 1–137.
Hartmann, H., "Flexible Netze—Dynamische nichthierarchiesche Verkehrslenkung", *Nachrichten Technische Zeitscrift* (1991); 44(10):724–732.
Stademann, R., "Optimized Dynamic Routing (ODR) bringt Betreibern nichthierarchischer Netze beachtliche wirtschaftliche Vorteile", *2323 Telecon Report (Siemens)*, (1995); 18(5):243–247.
*Microsoft Press, Computer Dictionary*, 3rd Ed., (1997); p. 72.

* cited by examiner

*Primary Examiner*—Chi Pham
*Assistant Examiner*—Derrick W Ferris
(74) *Attorney, Agent, or Firm*—Fish & Richardson P.C.

(57) ABSTRACT

A communication network includes a second switching equipment and a first switching equipment connected to the second switching equipment by connection paths. The connection paths include a first set of connection paths and second set of connection paths. The first switching equipment includes a first storage area for storing bits of information associated with an availability of bandwidth for the first set of connection paths, a second storage area for storing bits of information associated with an availability of bandwidth for the second set of connection paths, and a controller to determine whether a suitable connection path exists in the first set of connection paths based on the bits of information stored in the first storage area. If the suitable connection path does not exist in the first set of connection paths, the controller selects the second switching equipment to allocate the second transmission channel to the requested connection.

16 Claims, 2 Drawing Sheets

METHOD AND A NETWORK FOR ATM SWITCHING

RELATED APPLICATIONS

This application claims priority to PCT Application PCT/DE99/00673, filed on Mar. 11, 1999, which claims priority to German Application No. 198 10 559.2, filed Mar. 11, 1998, now German Patent No. DE 19810559 A1.

BACKGROUND OF THE INVENTION

The present invention relates to a switching equipment and related method for an ATM broadband communication network.

DESCRIPTION OF THE RELATED ART

In communication networks, a plurality of switching equipment, which serve as network nodes, are physically connected to one another via connecting paths. For purposes of setting up a connection between two users of the communication network, an appropriate connecting path, proceeding from the destination node, must be initially determined from the calling user to the called user.

In order the facilitate the determination of the appropriate connecting path (routing), the principle of virtual connections has been invented, which is particularly applied in ATM broadband communication networks (asynchronous transfer mode). The transport of the data via the network is facilitated with the aid of virtual connections and therefore is accelerated. According to the ATM standard, the data to be transmitted are transmitted in the form of cells, which generally comprise a control field (header) of 5 bytes and an information field (payload) of 48 bytes. The sent ATM cells, corresponding to the bits of information prescribed in their headers, are passed through the communication network on "virtual paths" or "virtual connections." According to the principle of the virtual connections, the path to the destination is prescribed only once at the beginning. The individual switching equipment provides this desired switching path with a code that is valid respectively between two adjacent network nodes and allocates the code to the connection. This code is respectively noted in the control field (header) of the cells (virtual path connection identifier, VPCI). Therefore, the switching equipment no longer has to prepare the destination path anew when an ATM cell arrives; it merely look at the code and thus knows the desired destination "Virtual connections" contrast to real connections in the communication network in that the transmission channel is not permanently busy for the duration of the connection, but the transmission channel is occupied only when data to be transmitted are actually present, i.e., that packets or cells of a connection are not transmitted without pauses during the entire connection time, but packets of other connections are forwarded in the pauses on the same transmission path at the same time.

What derives from the previously explained principle of the virtual connections is that a plurality of transmission channels are transmitted via a virtual connection (virtual path connection, VPC). Each transmission receives a virtual channel (VC), so that a virtual path can comprise a plurality of virtual channels. The allocation of the virtual channels ensues in the network nodes, i.e., the individual switching equipment, by which when a virtual channel is allocated or, respectively occupied, the resource bandwidth) required for the respective transmission of the virtual channel must be occupied at the same time. The basic method for the occupancy of a virtual channel and therefore of the bandwidth for the respective connection is, according to the ITU-T-recommendation Q.2764 (International Telecommunications Union), defined as follows:

A virtual channel is prescribed between two adjacent network nodes or, respectively, switching equipments when the appropriate transmission path or, respectively, ting path is prescribed. Only one of the two adjacent switching equipment is allowed to assign the virtual channel, and therefore the occupied bandwidth, in order to avoid a counter-occupancy of transmission channels and also in order to exclude a counter-occupancy of the bandwidth for the individual transmissions. In each switching equipment is configured which of the connected connecting paths the, respective switching equipment is allowed to assign a virtual channel and therefore a bandwidth to be occupied. The switching equipment authorized for allocating a virtual channel is called an "assigning exchange," whereas the other switching equipment, in this case, is called a "non-assigning exchange." Each switching equipment monitors or, respectively, keeps track of the free or, respectively, occupied bandwidth of exclusively the virtual connections for which the switching equipment is configured as "assigning exchange." The administration of the free or, respectively, occupied bandwidth ensues in the form of a table, which is realized via a file or another storage, and which is referred to as a "bandwidth pool."

A switching equipment which is configured as a non-assigning exchange for a specific virtual connection is not allowed to occupy a virtual channel for this virtual connection and therefore is not allowed to occupy a bandwidth for a connection request either. Particularly according to the prior art, a switching equipment is not to keep track of the free or, respectively, occupied bandwidth of virtual connections, for which it is configured as a "non-assigning exchange," i.e., that a "bandwidth pool" is not to be kept in the corresponding switching equipment regarding these virtual connections, since the "bandwidth pools" that are simultaneously kept in the two switching equipments units would otherwise never be identical in the course of the switching traffic (e.g., particularly during the connection setup between the B-ISUP-messages "release message" (REL) and "release complete" (RLC)). Besides, the "bandwidth pools" would otherwise diverge due to different calculation algorithms in the two switching equipment units, which can result from having different manufacturers or network providers; this is particularly serious when the bit rates are not constant.

The switching method, which has previously been proposed according to the ITU-T-recommendation Q.2764, is explained below in greater detail on the basis of FIG. 2.

FIG. 2 exemplary shows the section of a communication network with three switching equipment units 1-3, by which and in the present case, the switching equipment 1 is discussed in greater detail. The individual switching equipment units 1-3 are, connected to one another respectively via a plurality of virtual connecting paths (virtual path connection, VPC) 8–15. The switching equipment 1 comprises a central control device 6, which is responsible for processing incoming) connection requests and for the corresponding connection setup to the other switching equipments 2 and 3. In particular, when a connection request is present, the control device 6 selects a suitable connecting path to an adjacent switching device 2, 3 and occupies—if possible—the bandwidth required for the connection request, i.e., that it allocates a virtual transmission channel to an adjacent switching device 2, 3. The switching equipment 1 comprises storage 5 in which the function of the switching equipment 1 is configured. Particularly, the storage 5 stores for which of the connecting paths 9–15, that are connected to the switching equipment 1, the switching equipment 1 can become active, i.e., for which of the connected connecting paths 9 15 the switching equipment 1 itself is allowed to allocate a virtual channel and therefore is allowed to assign bandwidths. The present case assumes that the switching equipment 1 is allocation-authorized for the connecting paths 9-11 and therefore is allowed to give the required bandwidth when a connection request is present. On the other hand, the switching equipment 2 is allocation-authorized for the connecting paths 12, 13, whereas the switching equipment 3 is allocation-authorized for the connecting paths 14, 15, i.e., it is presupposed as an "assigning exchange." For example, it is also) configured, in the storage 5, via which of the adjacent network nodes a connecting path is generally to be set up when a connection request is present. For example, it can be fixed that the switching equipment 1 always select a connecting path via the switching equipment 2 when a connection request is present.

The switching equipment 1 also comprises storage 4, which represents the previously described "bandwidth pool," i.e., that the storage 4 stores a table in which the free or, respectively, occupied bandwidth of all connecting paths connected to the switching equipment 1 is administered, for which bandwidth the switching equipment is allocation-allocation-authorized and becomes active as an "assigning exchange"; this is merely the case for the connecting paths 9-11 in the present case. As shown in FIG. 2, the storage 4 stores the respectively occupied resources for each adjacent destination node 2, 3 and for each allocation-authorized connecting path 9–11, i.e., that they store the respectively occupied bandwidth, by which each connecting path (virtual path connection, VPC) is identified via a corresponding identifier (virtual path connection identifier, VPCI). Each virtual connecting path can comprise a plurality of virtual channels that have been allocated by the switching equipment 1 to this connecting path, so that the table (bandwidth pool) stored in the storage 4 considers the virtual channels allocated for each connecting path with the aid of an identifier (virtual channel identifier, VCI) and considers the bandwidth that is respectively occupied for the corresponding virtual channel.

When a connection request is present which is supplied to the switching equipment 1 (for example, via a further connecting path bundle 7 of a further (not shown) adjacent switching equipment), a suitable connecting path and a suitable transmission channel are fixed as follows:

As soon as the switching equipment 1 receives a connection request, the switching equipment 1 initially tries to occupy a connecting path, for which the switching equipment 1 is configured as an "assigning exchange," with an appropriate transmission channel, and tries to assign the bandwidth required for the connection request. This ensues via evaluating the table deposited in the storage 4. For example, when a connection request is present that would occupy approximately 40% of the bandwidth available in total on the connecting path 9, the switching equipment 1 could select the connecting path 9 for the desired connection and could allocate a virtual channel VCI-C and assign the bandwidth given the situation shown in FIG. 2. The transmission of control messages between the individual switching equipments 1–3 ensues according to the B-ISUP signalization protocol, so that the switching equipment 1, subsequent to the allocation of a virtual channel, informs the switching equipment 2 about the selected connecting path and the allocated transmission channel (potentially the occupied bandwidth) in the form of corresponding identifiers (virtual path connection identifier, VPCI and virtual channel identifier, VCI), whereby this ensues in the form of the first B-ISUP-forward message (initial address message, IAM).

On the other hand, when the switching equipment 1 was not able to detect a suitable transmission channel in the connection paths 9–11 for which it is configured as "assigning exchange," the connection must ensue via one of the connecting paths 12 15, for which the switching equipment 1 is configured as "non assigning exchange." In this case, the switching equipment 1 is not allowed to allocate a transmission channel and is not allowed to assign bandwidth for the desired connection, but must inquire the adjacent switching equipment 2, 3 about the required bandwidth. For this purpose, the switching equipment acting as "non-assigning exchange" does not insert identifiers into the B-ISUP-forward message IAM via the selected connecting path and the allocated transmission channel (VPCI, VCI), but sends this B-ISUP-forward message to one of the adjacent switching equipment units 2, 3. This ensues without the switching equipment 1 having bits of information about whether the bandwidth required for the desired connection can be provided by the corresponding switching equipment at all. After receipt of the requests for the allocation of a transmission channel, the corresponding switching equipment 2, 3, if possible: allocates a transmission channel on one of the connecting paths, for which the corresponding switching equipment is configured as an "assigning exchange," to the desired connection. For example, when the switching equipment 1 has transmitted a request for allocating a transmission channel to the switching equipment 2, the switching equipment 2 can search for an appropriate transmission channel merely on the connecting paths 12 and 13. When the switching equipment 2, in this case, is able to allocate an appropriate transmission channel on the connecting paths 12 and 13, the switching equipment 1 is informed of the selected connecting path and of the selected transmission channel in the form of the identifiers VPCI, VCI via the switching equipment 2 in a corresponding first B-ISUP-return-message, which is referred to as an "initial address message" (IAM).

The following problems result from the previously described course of action:

Each switching equipment 1 merely has bits of information about the bandwidth available on the connecting paths for which the respective switching equipment has been configured as an "assigning exchange," namely for which the respective switching equipment is authorized for allocating a transmission channel and for occupying corresponding bandwidth. For example, when the switching equipment 1, in FIG. 2, is not able to find an appropriate connecting path among these connecting paths for a present connection request, the occupancy message, namely the request regarding the occupancy of a transmission channel, is simply sent to the first best adjacent switching equipment 2, 3. This ensues without knowing whether the respective adjacent switching equipment 2, 3 provides sufficient resources for the desired connection. When the adjacent switching equipment 2, 3 contacted by the switching equipment 1 is not able to provide the required bandwidth on the connecting paths for which the switching equipment 2, 3 is configured as the "assigning exchange," the connection request is rejected via a B-ISUP-return-message IAR. (initial address reject). In this case, the switching equipment 1 tries again and inquires another one of the adjacent switching equipment units 2, 3 about whether it can provide a suitable connecting path for the desired connection (re-routing). Generally, the number of these rerouting processes is limited to one trial, so that a rerouting via a third connecting path can basically not occur. However, the resources on the connecting paths, for which the switching equipment 1 is configured as "non-assigning exchange," thus cannot be efficiently used. Furthermore, what derives from the previously described course of action is that the likelihood of a successful connection setup due to the fact that the switching equipment 1, for the case in which it itself cannot detect a suitable connecting path, is reduced and that a blind traffic' can occur. However, when a suitable connecting path between the switching equipment 1 and an adjacent switching equipment 2, 3 is not found, all connecting paths that have already been set up before the switching equipment 1, would have to be retroactively released, (namely cleared down) this is extremely complex.

Finally, it also derives from the previously cited reasons that a switching equipment should not be configured as a "non-assigning exchange" for all connecting paths present between two switching equipments, since this would be extremely inefficient for a successful connection setup.

SUMMARY OF THE INVENTION

Therefore, the present invention is based on the object of fashioning a switching equipment of the species cited above such that the likelihood of a successful connection setup and the efficiency of the connection setup is increased.

According to the present invention, tis object is achieved by a switching equipment for a communication network and related method for using it, where the switching equipment comprises an adjacent switching equipment which is connected to the switching equipment via connecting paths, the connecting paths being divided into first connecting paths and second connecting paths, wherein, when a connection request is present, the switching equipment is only authorized for the first connecting paths for allocating a transmission channel for the connection request, and the adjacent switching equipment that is connected to the first switching equipment via a corresponding second connecting path is authorized for allocating a corresponding transmission channel for the second connecting paths.

The switching equipment comprises a first storage for storing bits of information about the free or occupied resources of the first connecting paths; a controller detecting, on a basis of the bits of information stored in the first storing means, a suitable first connecting path which provides sufficient resources for a desired connection, when a connection request is present; and a second storage for storing bits of information about the free or occupied resources of the second connecting paths, the controller selecting one of the adjacent switching equipment on a basis of the bits of information stored in the second storage when a suitable first connecting path could not be detected on a basis of the bits of information stored in the first storage given a presence of a connection request, one of the adjacent switching equipment being connected to the switching equipment via one of the second connecting paths, which is more likely able to provide sufficient resources for the desired connection, and the controller transmitting an inquiry message to the selected adjacent switching equipment for allocating a transmission channel for the desired connection.

According to the present invention, the connection path search, namely the "routing," is fashioned significantly more efficient in that the switching equipment also keeps bits of information about the momentary occupancy of the connecting paths for the connecting paths, for which it is configured as a "non-as signing exchange." In particular, these bits of information are deposited in the form of a data shadow table ("shadow bandwidth pool"). When the switching equipment is not able to detect a suitable connecting path among the connecting paths for which it itself is configured as an "assigning exchange," the switching equipment, on the basis of the bits of information stored in this shadow table, can select an adjacent switching equipment that provides, with great probability, sufficient resources for the connection request. Adjacent switching equipment units that are likely not to be able to provide the required bandwidth are not taken into consideration for the "routing process" at all.

As a result of this embodiment of the present invention, the number of the successful connection trials can be significantly increased in the case that the switching equipment cannot detect any suitable connecting paths, for which it itself is configured as an "assigning exchange". The blind traffic, which is conditioned by hopeless connection setups, is significantly reduced and the efficiency of the path search is considerably increased.

BRIEF DESCRIPTION OF THE DRAWINGS

The invention is subsequently explained in greater detail on the basis of a preferred embodiment illustrated in the drawings.

DESCRIPTION OF THE PREFERRED EMBODIMENTS

Figure 1:
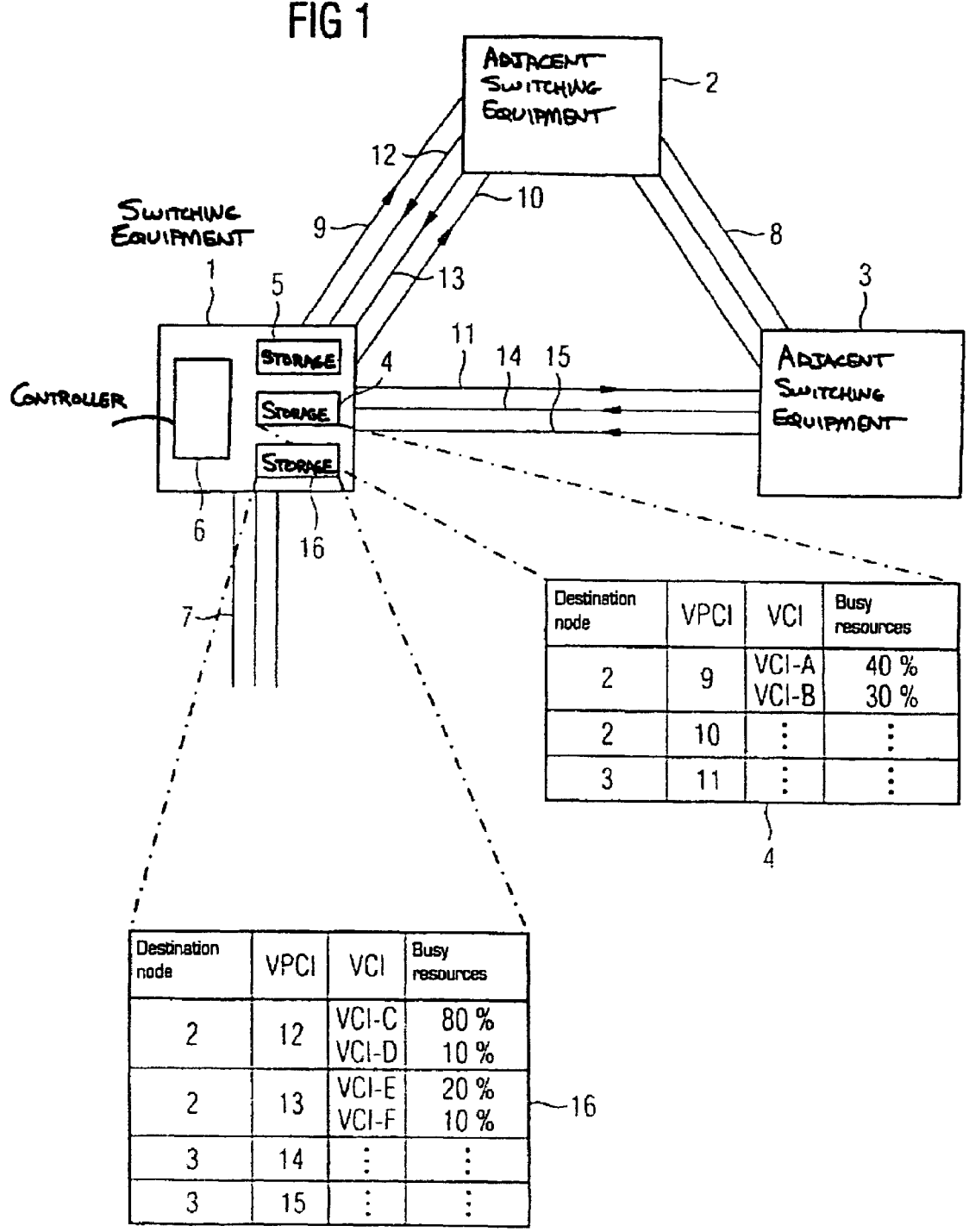
FIG. 1 is a block diagram illustrating the exemplary construction of a preferred embodiment of a switching equipment according to the present invention.
Figure 2:
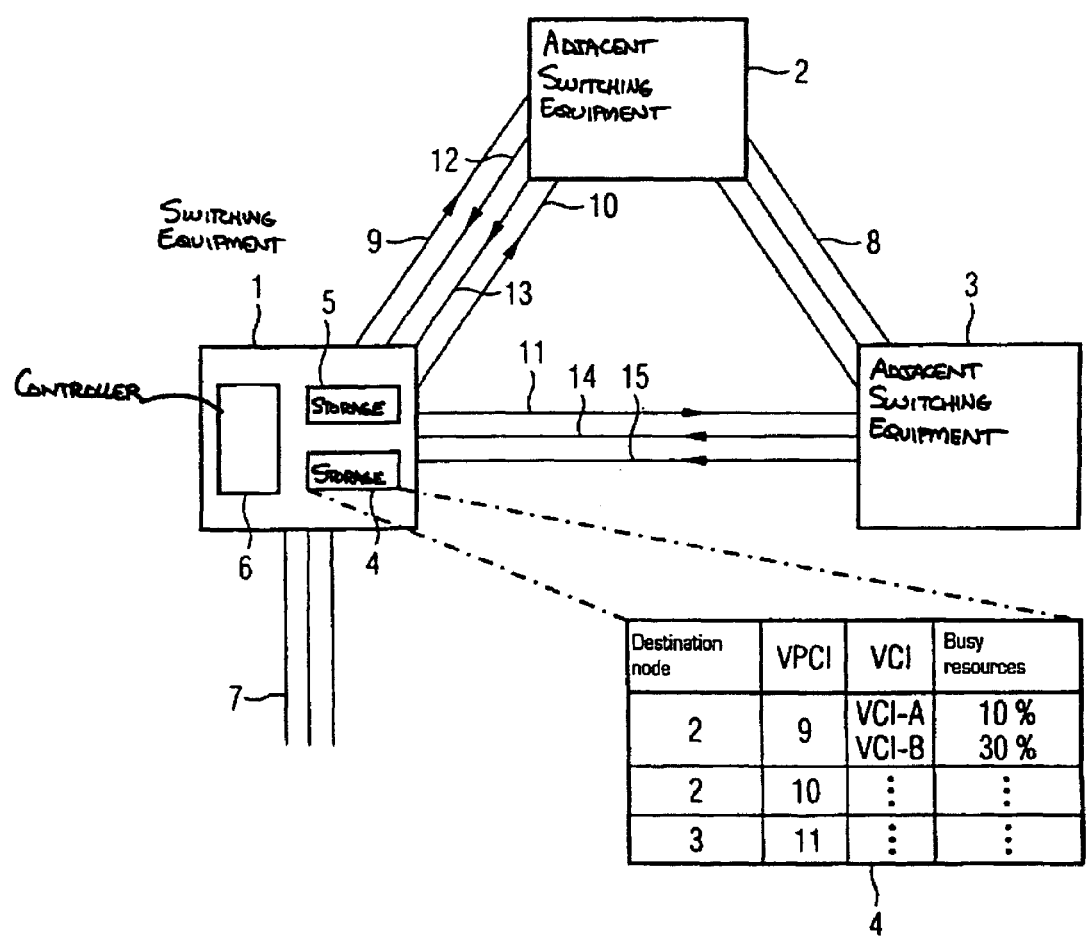
FIG. 2 is a block diagram illustrating the exemplary construction of a known switching equipment for an ATM communication network.

FIG. 1 shows the differences of the present invention vis-à-vis the known switching equipment shown in FIG. 2. The switching equipment shown in FIG. 1 is based on, the switching equipment shown in FIG. 2, so that the previously described way of functioning of the known switching equipment is expressly referenced here.

The switching equipment 1 shown in FIG. 1 functions in a way similar to that in FIG. 2. However, the critical difference of the present invention vis-à-vis the known switching equipment is the fact that, according to the present invention, the switching equipment 1 also stores bits of information about the occupancy of the connecting paths that are connected to the switching equipment 1, for which connecting paths the switching equipment 1 is configured as a "non-assigning exchange," namely for which the switching equipment 1 is not authorized for the allocation of a transmission channel (virtual channel, VC) and for the corresponding occupancy of the bandwidth when a connection request is present. Given the exemplary embodiment shown in FIG. 1, this is particularly the case with respect to the connecting paths 12–15, by which the switching equipment 2 is configured as an "assigning exchange" concerning the connecting paths 12, 13 and the switching equipment 3 is configured as an "assigning exchange" concerning the connecting paths 14, 15, and only the switching equipment 2 or, respectively, 3 is allowed to allocate a transmission channel and a corresponding bandwidth when a connection request is present about these connecting paths 12–15.

The switching equipment 1 administers the bits of information about the occupied resources of the respective connecting paths, for which it is configured as a "non-assigning exchange," in the form of a shadow table that is deposited in further storage 16. This shadow table can be particularly realized in the form of a file or in the form of a physical storage unit. This shadow table ("shadow bandwidth pool") is essentially analogously structured to the table ("bandwidth pool") deposited in the storage 4, where the table administers the connecting paths 9–11, for which the switching equipment 1 is configured as an "assigning exchange." This means that the momentary occupancy of the individual connecting paths 12–15 and the virtual channels ("virtual channel," VC) momentarily allocated via these connecting paths are also defined in this table, which is deposited in the storage 16. Each connecting path is identified in the form of an identifier ("virtual path connection identifier," VPCI), and the transmission channels that are momentarily fixed via this connecting path are specified in the form of "virtual channel identifiers, VCI" for each connecting path. Furthermore, the table deposited in the storage 16 contains how many resources are momentarily occupied by the respective connection. For example, the storage 16 contains information stating that the transmission, which is specified via the identifier VCI-C, momentarily occupies 80% of the bandwidth available via the connecting path 12 (VPCI=12). Corresponding bits of information are kept for all other connecting paths 12–15, for which the switching equipment 1 is not authorized for the allocation of a transmission channel and for the occupancy of bandwidth.

For example, when the switching equipment 1 receives a connection request via the connecting path bundle 7, the switching equipment 1 initially tries—as has already been explained on the basis of FIG. 2—to act as an "assigning exchange," i.e., that the switching equipment 1 tries to occupy a suitable transmission channel and a corresponding bandwidth in the connecting paths, for which the switching equipment 1 is configured as "assigning exchange." In the present exemplary embodiment, this is the case regarding the connecting paths 9–11. When a suitable connecting path, which provides sufficient resources for the desired connection, has been detected by the switching equipment 1 from the connecting paths 9–11, the switching equipment 1 allocates a transmission channel to the desired connection on the detected connecting path and occupies the required bandwidth. The switching equipment1 subsequently informs the corresponding adjacent switching equipment 2 or 3, in the form of the first B-ISUP-forward message, namely in the form of the what is referred to as an IAM-message ("initial address message"), of the "virtual path connection identifier" (VPCI) and the "virtual channel identifier" (VCI) of the occupied channel. To that extent, the function of the inventive switching equipment shown in FIG. 1 corresponds to the function of the switching equipment that is already known (compare FIG. 2).

However, when the switching equipment 1, on the basis of the connecting paths 9–11 for which the switching equipment 1 is authorized for the allocation of a transmission channel and for the occupancy of bandwidth, is not able to detect a suitable connecting path that provides sufficient resources for the desired connection, the switching equipment 1 must act as "non-assigning exchange" and must inquire one of the adjacent switching equipments 2, 3 about the required bandwidth. This means that the switching equipment 1 must detect a suitable adjacent switching equipment 2, 3 that acts as an "assigning exchange" for one of the connecting paths connected to the switching equipment 1. In the exemplary embodiment shown in FIG. 1, this is particularly the case with respect to the connecting paths 12–15. In order to detect an appropriate adjacent switching equipment 2, 3 the controller 6 of the switching equipment 1 accesses the bits of information deposited in the storage 16, namely access the shadow table (shadow bandwidth pool).

The controller 6 searches the bits of information deposited in the storage 16 for an adjacent switching equipment 2, 3 that is highly likely to be able to provide the bandwidth required for the present connection request. Additionally, for purposes of detecting the adjacent switching equipment to be contacted, which of the adjacent switching equipments 2, 3 offers the shortest connecting path is considered. This default is normally deposited in the storage 5, since—as has already been explained on the basis of FIG. 2 beginning it is configured, already at the of the initial operation, via which adjacent switching equipment a connection setup should normally ensue.

Let is be initially assumed, in the present case, that a connection request, which would occupy approximately 20% of the resources available in total on one of the connecting paths 9–15, is present at the switching equipment 1. Given the situation shown in FIG. 1 and the table content of the storage 4 and 16 shown in FIG. 1, this would mean that the switching equipment 1 initially searches the table content (bandwidth pool) of the storage 4 for an appropriate connecting path. Since a total of 70% of the connecting path 9 is momentarily occupied by the transmission channels VCI-A and VCI-B, the connecting path 9 still provides sufficient resources, namely a sufficient bandwidth, for the desired connection request. As a result of this, the switching equipment 1 can select the connecting path 9 as suitable connecting path for the desired connection and, for example, allocates the transmission channel with the "virtual channel identifier" VCI-G to the desired connection. The switching equipment 2 is subsequently informed of the bits of information VPCI=9 and VCI=VCI-G in the form of the first B-ISUP-forward message.

Subsequently, let it be assumed that the connection request at the switching equipment would occupy, for example, 50% of the bandwidth respectively available in total on the individual connecting paths 9–15. In this case, the switching equipment 1 or, respectively, its controller 6, on the basis of the bits of information deposited in the storage 6, cannot detect a suitable connecting path to an adjacent switching equipment 2, 3 for which the switching equipment 1 has been configured as an "assigning exchange," namely for which the switching equipment 1 is authorized for providing a transmission channel and for occupying bandwidth. As a result, the switching equipment 1 must act as a "non-assigning exchange" and must inquire one of the adjacent switching equipment units 2, 3 about bandwidth. In order to select a suitable switching equipment, the controller accesses the bits of information deposited in the storage 16 (shadow bandwidth pool) and detects an adjacent switching equipment 2, 3 that is highly likely to provide sufficient resources for the present connection setup. Only the connecting path of the switching equipment 1, regarding which connecting paths the switching equipment 1 is not authorized for allocating a transmission channel and for occupying bandwidth, are considered in the storage 16. In the present case, this is particularly the situation with respect to the connecting paths 12–15. According to FIG. 1, it is stored, for example, that 2 transmission channels VCI-C and VCI-D which occupy a total of 90% of the resources available on the connecting path 12, have already been allocated by the switching equipment 2 for the connecting path 12. As a result, the connecting path 12 cannot be taken into consideration for the present connection request. On the other hand, two transmission channels VCI-E and VCI-F, which momentarily only occupy 30% of the resources available on this connecting path, have been allocated by the switching equipment 2 on the connecting path 13. The controller 6 therefore recognizes that the switching equipment 2 is likely to provides sufficient resources (namely in the form of the connecting path 13) for the pending connection request and therefore selects the switching equipment 2 as an "assigning exchange" for the present connection request. Subsequently, the switching equipment 1 transmits the B-ISUP-forward message IAM ("initial address message") to the switching equipment 2, however, without transmitting an appropriate VPCI information or VCI information at the same time. This occupancy message IAM is subsequently evaluated via the switching equipment 2, and the switching equipment 2 checks, on the basis of the bits of information available to it about the connecting paths 12, 13, is configured as an "assigning exchange," whether a connecting path is, in fact, available that provides sufficient capacities or, respectively, resources for the present connection request. When this is the case, the switching equipment 2 allocates a transmission channel on a suitable connecting path to the present connection request. In the present case, the switching equipment 2, for example, can allocate a transmission channel VCI-G on the connecting path 13. The switching equipment 1, in the form of the first B-ISUP-return message IAA ("initial address as knowledgment"), is subsequently informed via the switching equipment 2 regarding bits of information about the selected connecting path and the allocated transmission channel, i.e., that the switching equipment 1 is informed of the values VPCI=13 and VCI=VCI-G via the switching equipment 2. The bits of information transmitted via the switching equipment 2 to the switching equipment 1 also contain bits of information about the resources occupied by the selected transmission channel, so that the switching equipment 1 or, respectively, its controller 6 can correspondingly update the bits of information deposited in the controller 6.

Should the switching equipment 2, contrary to the assumption of the switching equipment 1, not be able to find an appropriate connecting path after receipt of a corresponding request of the switching equipment 1, the connection request is rejected by the switching equipment 2 in the form of the B-IUP-return message IAR ("initial address rechecked"). In this case, the switching equipment 1 must select another adjacent switching equipment, which is able to act as an "assigning exchange," i.e., that a re-routing is carried out.

Finally, due to the reasons described in the beginning, the switching equipment 1, which becomes active as a "non-assigning exchange," is not allowed to utilize the bits of information deposited in the shadow table of the storage 16 for purposes of accepting a connection and for purposes of allocating a transmission channel. The switching equipment, which is configured as an "assigning exchange" for the corresponding connecting path, is allowed to exclusively decide about the allocation of a transmission channel and the occupancy of a bandwidth.

The above-described switching equipment and related method are illustrative of the principles of the present invention. Numerous modifications and adaptations thereof will be readily apparent to those skilled in this art without departing from the spirit and scope of the present invention.

We claim as our invention:
1. A communication network comprising:
second switching equipment; and
first switching equipment connected to the second switching equipment by connection paths, the connection paths comprising a first set of connection paths and a second set of connection paths, the first switching equipment allocating a first transmission channel to any one of the first set of connection paths and the second switching equipment allocating a second transmission channel to anyone of the second set of connection paths, the first switching equipment comprising:
 a first storage area for storing bits of information associated with an availability of bandwidth for the first set of connection paths;
 a second storage area for storing bits of information associated with an availability of bandwidth for the second set of connection paths; and
 a controller to determine whether a suitable connection path exists in the first set of connection paths based on the bits of information stored in the first storage area, the suitable connection path providing suitable bandwidth for a requested connection;
wherein if the suitable connection path does not exist in the first set of connection paths,
the controller selects the second switching equipment, based on the bits of information stored in the second storage area, to allocate the second transmission channel to the requested connection.

2. The network of claim 1, wherein after the controller determines that the suitable connection path exists in the first set of connection paths, the controller transmits bits of information associated with the first transmission channel allocated to the requested connection and bits of information associated with the suitable connection path to the second switching equipment.

3. The network of claim 2, wherein, if the controller determines that the suitable connection path does not exist in the first set of connection paths, the controller transmits an inquiry message to the second switching equipment to allocate the second transmission channel to the requested connection, the inquiry message does not include bits of information associated with the suitable connection path nor the second transmission channel.

4. The network of claim 3, wherein after the controller transmits the inquiry message to the second switching equipment and after the controller determines that a suitable connection path is in the second set of connection paths the controller updates the bits of information stored in the second storage area based on a confirmation message from the second switching equipment, and
wherein the confirmation message comprises bits of information associated with the second transmission channel, an availability of bandwidth for the requested connection, and the suitable connection path selected by the second switching equipment.

5. The network of claim 1, wherein communication between the first switching equipment and the second switching equipment is accomplished through B-ISUP signalization messages.

6. The network of claim 1, further comprising:
a third storage area for storing configuration data of the first switching equipment,
wherein the configuration data designates, which connection paths connected to the first switching equipment are from the first set of connection paths, and which of the connection paths are from the second set of connection paths.

7. The network of claim 6, wherein the configuration data stored in the third storage area designates which switching equipment connected to the first switching equipment the first switching equipment analyzes to determine if the suitable connection path exists.

8. The network of claim 1, wherein the communication network is an asynchronous transfer mode (ATM) broadband communication network.

9. A method for using switching equipment in a communications network, the communications network comprising first switching equipment, second switching equipment and connection paths, the connection paths connecting the first switching equipment to the second switching equipment, the connection paths comprising a first set of connection paths and a second set of connection paths, the second switching equipment allocating a second transmission channel to any one of the second set of connection paths, the first switching equipment comprising a controller, a first storage, and a second storage, the first switching equipment allocating a first transmission channel to any one of the first set of connection paths, the method comprising:

storing, in the first storage area, bits of information associated with an availability of bandwidth in the first set of connection paths;

determining whether a suitable connection path exists from the first set of connection paths based on the bits of information stored in the first storage area, the suitable connection path providing suitable bandwidth for a requested connection;

storing, in the second storage are, bits of information associated with an availability of bandwidth in the second set of connection paths; and when the suitable connection path is determined not to exist in the first set of connection paths, selecting the second switching equipment allocates the second transmission channel for the requested connection based on the bits of information stored in the second storage area.

10. The method of according to claim 9, further comprising:

after the controller determines that the suitable connection path exists in the first set of connection paths, transmitting, bits of information associated with the first transmission channel and bits of information associated with the suitable connection path.

11. The method according to claim 10, further comprising transmitting an inquiry message, the inquiry message not including bits of information associated with suitable the connection path nor the first transmission channel.

12. The method according to claim 9, further comprising after the controller transmits the inquiry message and after allocating the first transmission channel to the requested connection, updating the bits of information stored in the second storage area, based on a confirmation message from the second switching equipment, the confirmation message comprising bits of information associated with the second transmission channel, availability of bandwidth for the connection request, and the suitable connection path selected by the second switching equipment.

13. The method according to claim 9, wherein communication between the first switching equipment and the second switching equipment is accomplished through B-ISUP signalization messages.

14. The method according to claim 9, wherein the first switching equipment further comprises a third storage area, the method further comprising:

storing configuration data of the first switching equipment in the third storage area, wherein the configuration data comprises information about which connection paths connected to the first switching equipment are from the first set of connection paths, and which of the connecting paths are from the second set of connection paths.

15. The method according to claim 14 wherein the configuration data further comprises information associated with switching equipment connected to the first switching equipment and information that designates which switching equipment the first switching equipment will analyze to determine if the suitable connection path exists.

16. The method according to claim 9, wherein the communication network is an ATM broadband communication network.

* * * * *